(No Model.)
J. D. TOMPKINS.
PROCESS OF MAKING PAPER STOCK.
No. 458,135. Patented Aug. 18, 1891.
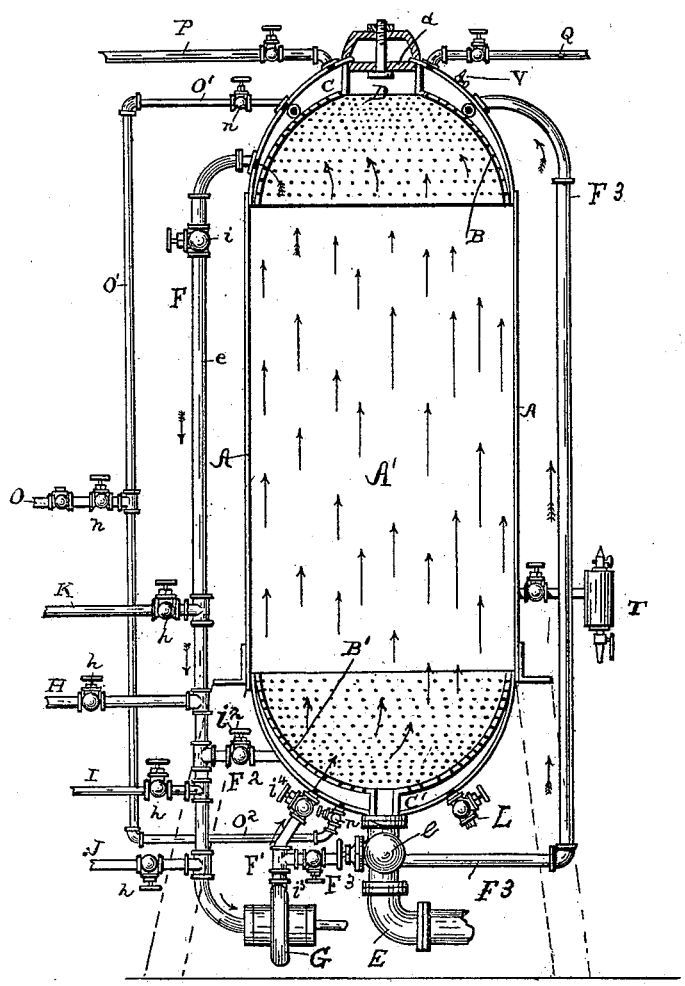

UNITED STATES PATENT OFFICE.

JOHN D. TOMPKINS, OF NASSAU, NEW YORK.

PROCESS OF MAKING PAPER-STOCK.

SPECIFICATION forming part of Letters Patent No. 458,135, dated August 18, 1891.

Application filed July 30, 1888. Serial No. 281,461. (No model.)

*To all whom it may concern:*

Be it known that I, JOHN D. TOMPKINS, of Nassau, in the county of Rensselaer, State of New York, have invented certain new and useful Improvements in Processes of Making Paper-Stock; and I do hereby declare the following to be a full, clear, and exact description thereof, such as will enable others skilled in the art to practice the invention.

It has heretofore been the practice to subject vegetable and other kindred material from which paper-stock is made to the successive action of various treating-liquids within a closed vessel or digester, and while thus inclosed to bring the treating-liquids into intimate contact with the material by spraying the liquids in a downward direction thereon, or by agitating the mass of material and liquids together, as by rotation of the digester. Both methods have been found in practice to be open to objection, the first, by reason of the fact that the downwardly-directed streams of liquid serve to pack the paper-stock material upon the bottom diaphragm of the digester, the effect of which is to transform the material into a strainer or filtering mass, gather the lignine and other material picked up by the treating-liquors upon the top of the mass, and to unevenly affect the material by the treating-liquids. It will be readily understood that when the mass is packed upon the bottom of the digester, the upper portion of the mass will be much more affected than the lower portion, and hence the material will be fully acted upon in one portion, partially acted upon in another, and, to a great extent, unacted upon at the lowermost part of the mass. The second, that agitation of the material and liquids by rotation or other movement of the digester tends, in a measure, to break up and destroy the fibrous character of the paper-stock material thus acted on.

The object of my invention is to treat the material in a closed digester, and in such a manner that no packing of the material will occur, the fiber not be injuriously affected, the adventitious materials separated therefrom, and all of the material brought into the best possible position to be evenly and effectively acted upon, and this I accomplish in a manner which I will now proceed to describe.

It may be generally stated that the majority of the various vegetable or kindred substances from which paper-stock may be made are of a lower specific gravity than water, and hence tend to float in water or in any of the treating-liquids commonly employed. It is also true that such materials will absorb the liquids within which they are immersed, and when thoroughly soaked will sink or gravitate to the bottom of the vessel within which they are placed. In practice it has been found that if the materials can be kept in a suspended condition in the treating-liquid, they will be most thoroughly and effectively acted on, and also that the strength of the treating-liquid may be materially reduced, as also the time required to effect the treatment.

My improved method of treatment is based upon the theory that the material from which the paper-stock is to be made should be suspended in the treating-liquid while in the digester and while thus suspended subjected to the heating, cleansing, or chemical action of the suspending-liquid.

In order to carry my improved process into practice, I have found it convenient to make use of apparatus which I will now proceed to describe.

The drawing shows a vertical section of a digester with the tanks, pipes, pumps, &c., used in connection therewith in elevation.

Referring to the drawing, A represents the casing or shell, preferably made of boiler-plate and of any convenient shape or size. The interior of the shell may be lined with any acid-resisting material which will not be affected by the action of any of the chemical liquids used in the digester. Central within the shell is the digesting-chamber A' and at each end are the chambers C C', separated from the digesting-chamber by perforated walls or diaphragms B B'. In the top of the digester is a man-hole D, provided with a closing-plate d, through which the material to be treated may be introduced into the digesting-chamber. In the bottom of the shell, and connected with the digesting-chamber, is a discharge-pipe E, provided with a valve e, through which the treated material may be drawn from the digesting-chamber. The chambers C and C' are connected together through the pipes F F' outside of the shell, and in the lower part of the pipes F F' is interposed a pump G, adapted to deliver the liquid therefrom into the chamber C'. Connected to the pipe F is the small pipe $F^2$, which is also connected to the chamber C', and connected to the eduction-pipe F' and the pump is a pipe $F^3$, which is connected with the upper chamber C. Normally the pump G draws its supply of liquid from the upper chamber C by the pipe F, delivering it into the lower chamber C'; but by closing the valve $i$ in the pipe F and opening the valve $i^2$ in the pipe $F^2$ and opening valve $i^3$ in pipe $F^3$ and valve $i^4$ in pipe F' the pump will draw its supply of liquid from the lower chamber C' and deliver it into the upper chamber C. The object of this arrangement will hereinafter be more fully described.

The pipe F is the pipe through which the treating-liquids are introduced into the digester and normally caused to circulate therein. The treating-liquids while not in use are, as a rule, stored in tanks (not shown) contiguous to the digester, and these tanks I connect to the pipe F through the pipes H I J K, provided with the valves $h$. A single flexible pipe, however, will serve the purpose of all of these pipes, as it may be united to several tanks in succession and as required. O represents a pipe connected to any suitable source of steam, which pipe is connected through the branch pipes O' $O^2$ to the chambers C and C'. Suitable valves $n$ are included in these pipes. A waste-steam pipe P connects the upper chamber C with any suitable water-tank or other device for collecting the condensed water from the steam. A similar pipe Q connects the upper chamber C with any suitable tank within which the bleaching-gases may be stored.

L is a waste-valve leading from the lower chamber C', through which the treating-liquids may be drawn away.

T is a tester of the usual form, connected to the side of the digesting-chamber, and V an air-valve in the top of the chamber C.

The material to be treated is introduced through the man-hole D. At the same time the pump G is started, drawing the preliminary treating-liquid from the tank within which it is stored, through the pipe H, and delivering it into the chamber C', and from thence in an upward direction through the perforations of the diaphragm, the sum of the areas of which is made preferably somewhat less than the area of the inlet-pipe, so as to impart a certain velocity to the upwardly-directed streams of liquid transmitted through the perforations. The upwardly-directed streams are projected against the material as it is introduced into the digesting-chamber, so as in effect to effectually spray the material from below as it falls into the chamber. When sufficient quantities of material and liquid have been introduced into the digesting-chamber, the valve in the pipe H is closed and the pump G draws the liquid from the upper chamber C and introduces it into the lower chamber, from whence it is sprayed upward against the mass of material in the digester, which, becoming soaked, tends to gravitate. The effect of the upwardly-directed streams of liquid impelled from the pump through the diaphragm is to overcome the gravity of the particles of material within the digesting-chamber and to hold them, so to speak, in suspension in the treating-liquid.

It is my purpose in treating the material in the digesting-chamber to keep the material in suspension in the treating-liquid, and hence the direction of flow or circulation of the treating-liquid is always from below upward. When treating certain classes of paper-stock material, it is occasionally found that the light feathery portions tend to be carried upward and to lodge against the digester-surface of the diaphragm B. As the diaphragm becomes covered with this material, the circulation is of course impeded, and in order to overcome this difficulty I have arranged the pump G and the various communicating pipes so that the direction of circulation of the liquid within the digester may be reversed and the liquid drawn from the lower chamber C' and delivered into the upper chamber C, and from thence through the diaphragm B in a downward direction upon the material within the digesting-chamber. The effect of the reversal in the circulation is to cleanse the diaphragm B from any adhering particles of material which tend to impede the free passage of the treating-liquid when circulating in the normal direction by the influence of the pump. It is my purpose to continue the reversed direction of the circulation only for the time necessary to cleanse the diaphragm.

I wish it understood that I do not limit myself in my present application to any successive series of steps constituting a treating process, as the steps may be varied and the treating-liquids used of varying character without departing from the intent of my invention. Usually, however, I first subject the paper-stock material to the action of highly-heated water, which water may be heated external to the digester or within the digester by steam introduced into the digester through the steam-pipe O and O' $O^2$. I prefer that the preliminary cooking of the material should be accomplished with the temperature of the liquid below the boiling-point, so as not to set the color in the material and to effect the solution of the greater portion of the soluble materials contained within the paper-stock material. Subsequent to the preliminary cooking, which may be continued for from one to four hours, as required, the materials may be washed and rinsed in one or more waters. Following the cooking and washing, the material is treated to a second cooking with any liquid of an alkaline character—as, for instance, a solution of caustic potash or soda—suitable to the material to be acted upon in the digester. The character of the treating-liquids is so well understood that I do not consider it necessary to enter into any specific description thereof. The alkaline liquors may be heated within the digester in a manner similar to the preliminary cooking-liquor, and the cooking may be continued for from one to seven hours, as required. Subsequent to the alkaline cooking the material is again washed and rinsed and the condition of the material noted through the tester T.

Next follows the process of bleaching. This is substantially similar to any ordinary bleaching process employed with apparatus of this description. After the bleaching has been completed any gases contained within the digester may be drawn off through the pipe Q and discharged into any suitable tank or vessel to be preserved or reused. The material is again washed and rinsed, which completes the process. The completed paper-stock is discharged from the digester through the pipe D.

In the preliminary treatment of cooking with water and in subsequent treatment of cooking with an alkaline liquid, as well as in the washing and rinsing steps, the various soluble matters contained in the paper-stock material will be taken up by the circulating liquids which will have their specific gravity increased thereby. In the treatment of paper-stock materials as heretofore practiced, and where the liquids were circulated downwardly, the material became compacted in the lower portion of the digester and the top portion of the mass operated as a strainer to extract the thickened matters from the liquids, so that all the gummy portion of the dissolved substances associated with the paper-stock material was deposited in the uppermost portion of the compacted mass, and thereby necessitated the transfer of the material to a special washing-machine subsequently to its removal from the digester. My improved method of treatment differs in that all the various substances extracted from the paper-stock material are strained out at the lower side of the mass, where by their gravity they naturally tend, and from which they can be removed through the waste-pipe L or main discharge-pipe E prior to the removal of the body of the material within the digesting-chamber.

I wish it understood that I do not limit myself to the particular construction of digester or pipe-circuits shown, as it will be obvious that many changes may be made therein without departing from the intent of my invention. The apparatus shown and described is, however, that which I consider best adapted to carry my invention into effect.

I claim as my invention—

The herein-described art of treating fibrous and other kindred materials for their conversion into paper-stock, which consists in effecting the suspension of such materials in a constantly-rising current of the treating-liquid, and while thus suspended subjecting the material to the heating, cleansing, or chemical action of the suspending-liquid.

In witness whereof I have hereunto set my hand this 9th day of July, 1888.

JOHN D. TOMPKINS.

Witnesses:
  ALEX. SELKIRK,
  CHARLES SELKIRK.